July 29, 1958

G. C. DETLEFSON 2,845,084

FLUID COOLED DIAPHRAGM VALVE

Filed Jan. 4, 1954

Inventor,
Gustav C. Detlefson.
By Joseph O. Lange
Atty.

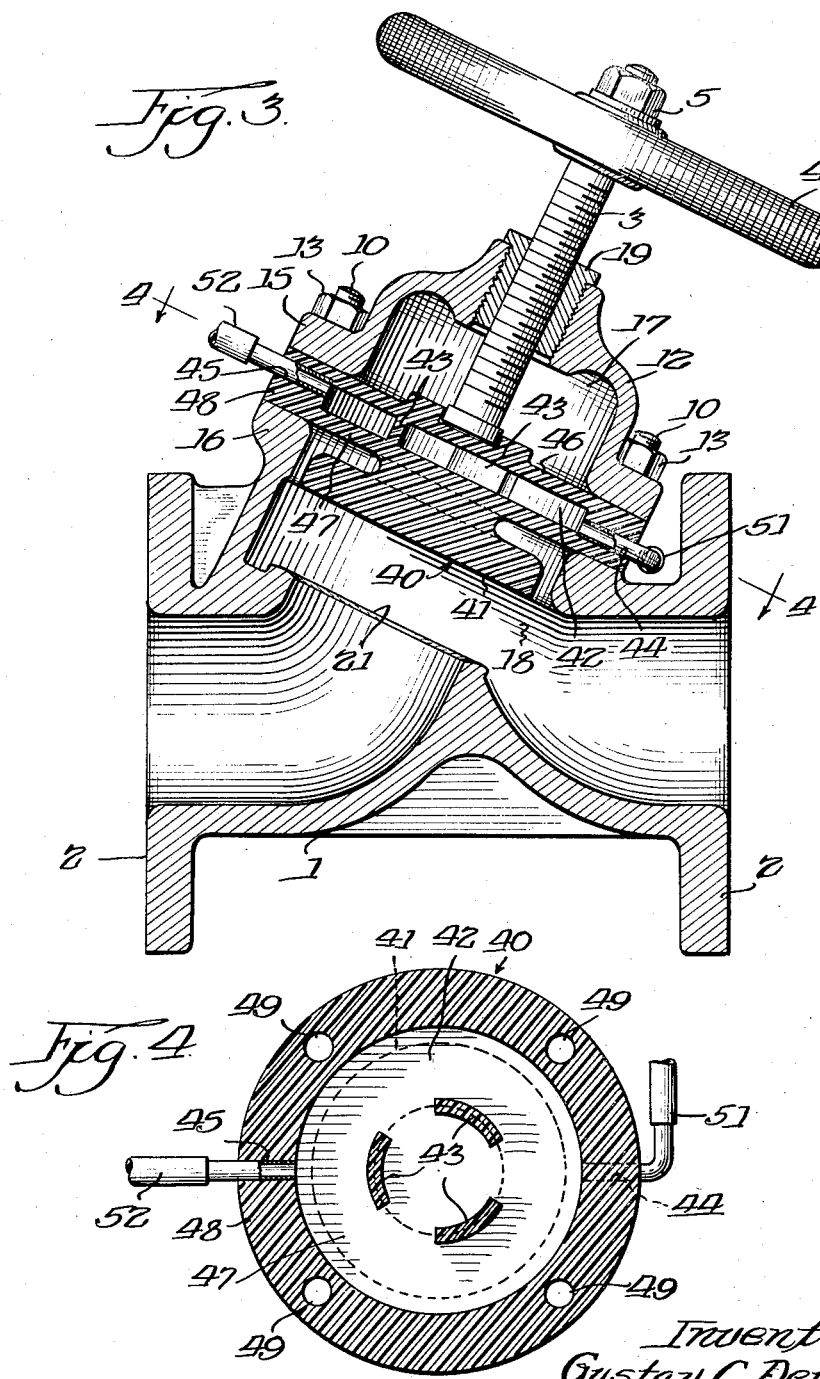

United States Patent Office 2,845,084
Patented July 29, 1958

2,845,084

FLUID COOLED DIAPHRAGM VALVE

Gustav C. Detlefson, Chicago, Ill., assignor to Crane Co., Chicago, Ill., a corporation of Illinois Application January 4, 1954, Serial No. 401,778

3 Claims. (Cl. 137—340)

This invention relates to diaphragm valves and more particularly it is concerned with a novel and improved diaphragm having an inner chamber or compartment whereby fluids having appropriate heat exchange properties may be circulated therethrough in the normal course of valve operation.

For a better understanding of the present invention, it should be appreciated that the usual valve diaphragm is composed of plastic or rubber, or other similar substances having a relatively limited temperature range in which to properly operate. Consequently, neither extremely high nor low operating temperatures may ordinarily be successfully employed without an objectionable effect upon valve operation, either because of melting, cracking or similar failure of the diaphragm owing to its inability to withstand the aforementioned temperatures.

It is therefore a main object of my invention to provide a valve diaphragm which will be capable of efficient operation over a temperature range of greater magnitude than has heretofore been possible.

It is a further object of my invention to present a flexible diaphragm design which is both simple and comparatively inexpensive to manufacture in addition to being efficient in operation.

Other objects and advantages will become more manifest upon proceeding with the following detailed description read in the light of the accompanying drawing, in which Fig. 1 is a sectional assembly view of a diaphragm valve utilizing my invention.

Fig. 3 is a sectional view of a diaphragm valve employing a diaphragm employing an integral closure member.

Fig. 4 is a sectional view taken on lines 4—4 of Fig. 3.

Similar reference numerals refer to similar parts throughout the several views.

Figure 1:
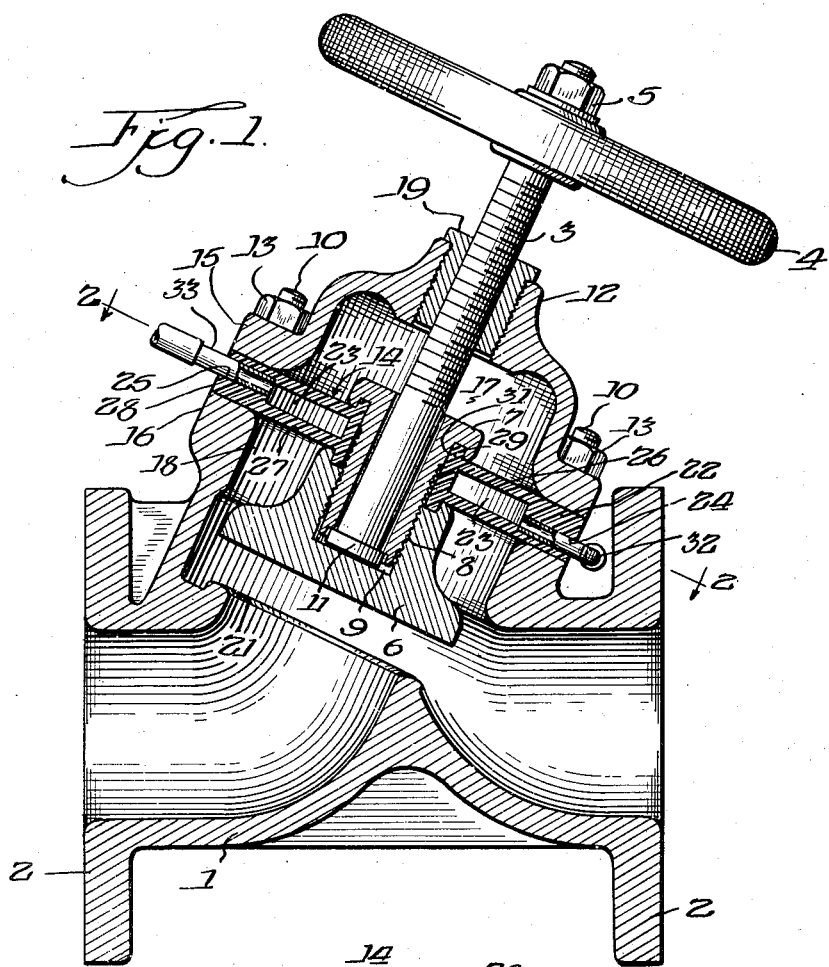

Referring now to Fig. 1, a valve body or casing 1 is illustrated having the conventional flange ends 2 for connection to a pipeline (not shown), although other means of pipeline attachment, such as threaded ends, will operate to similar advantage. A valve stem 3 is provided with a closure member 6 attached to its lower extremity and a conventional handle or wheel 4 affixed to its upper extremity by means of nut 5. The attachment between the stem end portion and closure member is rendered fluid tight by means of the interposed disc stem ring 7 which is threaded as at 8 for engagement with the closure member 6. The latter member has a recess 9 in which the stem head 11 preferably revolves freely enabling the closure member and stem to be reciprocally raised or lowered in the normal course of valve operation. The bonnet 12 is securely fastened by means of the usual nuts 13 and the studs 10 to the casing 1. The diaphragm 14 which constitutes my invention is interposed between the bonnet flange 15 and casing flange 16 and at its outer annular limits functions as a common fluid tight wall or gasket between the bonnet chamber 17 and the casing chamber 18. The bonnet bushing 19 is the threaded bearing enabling the revolvable rising stem 3 to reciprocally move the closure member 6 as previously referred to. Upon the occurrence of a downward movement of the stem 3, the closure member 6 effects the usual fluid tight annular seal upon contacting the valve seating surface 21.

Figure 2:
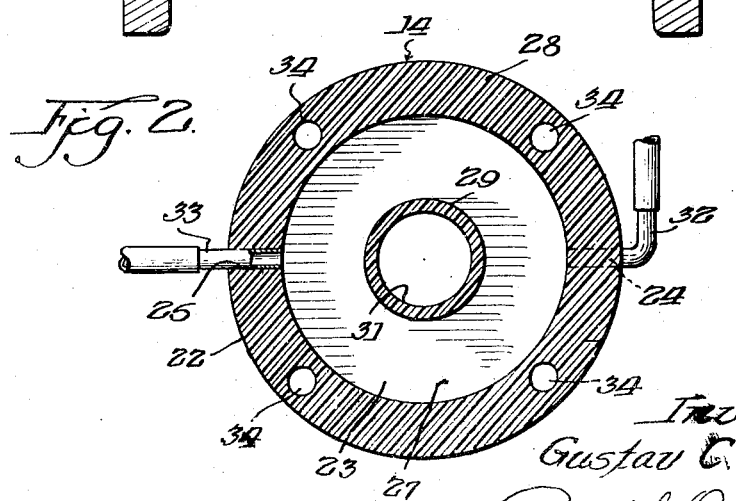
Fig. 2 is a sectional view taken on line 2—2 of Fig. 1.

More particular attention will now be given to the flexible diaphragm 14. It comprises the relatively heavy outer peripheral wall 28 which is compressed between the bonnet flange 15 and casing flange 16. The peripheral wall 28 is apertured at 34 as shown in Fig. 2 to facilitate passage of the stud members 10 therethrough prior to the assembly of the bonnet 12 with the casing 1. The diaphragm chamber 23 serves as the container to define the circulatory path to be followed by a cooling or heating fluid medium which enters the chamber by means of conduit terminus 32 which is inserted in diaphragm aperture 24. Having traversed the diaphragm chamber 23, the heat exchange fluid exits through conduit terminus 33 which is inserted in diaphragm aperture 25. It will be clear that the circulating fluid in flowing through chamber 23 continuously absorbs or radiates heat to the lower diaphragm surface 27 which is in direct contact with the fluid passing through casing chamber 18. It will also be apparent that a range of temperatures of greater magnitude may be utilized in valves employing my invention than has heretofore been possible. The extreme temperature condition prevalent in the underside of bottom diaphragm surface 27 thus may be quickly dissipated by the appropriate circulating fluid passing through diaphragm chamber 23.

It should be noted that the diaphragm outlet aperture 25 is preferably positioned higher on the diaphragm periphery than inlet aperture 24 thereby to insure a sufficient volume of circulating fluid in chamber 23 at all times. It is, of course, obvious that appropriate heating or cooling devices (not shown) may be utilized in the fluid conduit between termini 32 and 33 if exacting control of the temperature of the circulating fluid medium is desired.

The annular diaphragm portion 29, the inner surface of which defines the inner wall of circulatory chamber 25 and the outer surface of which defines the stem ring aperture 31, should be of sufficient thickness so as not to collapse or buckle between the compressive forces exerted thereon by the stem ring 7 and closure member 6. The thickened portion 29, in addition, lends sufficient strength to the diaphragm to prevent collapse of the chamber 23 upon the impingement of fluids in casing chamber 16 against the lower diaphragm surface 27.

Although Fig. 1 depicts the chambered diaphragm 8 as being utilized in a valve employing a distinct closure member 4 separate from the diaphragm itself, it is apparent that a chambered diaphragm will work to similar advantage where there is no separate closure member.

In those diaphragm valves employing a diaphragm member which also functions as a closure member, a diaphragm structure such as that depicted in Figs. 3 and 4 may be utilized for the purpose of obtaining the benefits of my invention.

In the instant modification, the unitary diaphragm 40 comprises a seating portion 41 which engages seating surface 21, and an upper chambered portion contiguous therewith. The latter upper chambered portion comprises an upper diaphragm surface 46, a lower diaphragm surface 47 and a thickened peripheral diaphragm portion 48 which is apertured at 49 as shown in Fig. 4 for purposes of assembly to the bonnet 12 and casing 1. The surfaces 46 and 47 together with the peripheral portion 48 define a circulating chamber 42 through which a fluid having proper heat-exchange properties may flow. The circulating fluid emerges from conduit terminus 51 which is inserted in diaphragm entrance aperture 44, traverses the chamber 42 and exits through conduit terminus 52 which is inserted in diaphragm exit aperture 45.

Particular notice will now be given to novel supporting segments 43 which maintain opposed diaphragm surfaces 47 and 46 in spaced-apart relationship. Despite the presence of high fluid pressures in the casing chamber 18, segments 43 prevent opposed surfaces 46 and 47 from buckling or collapsing and thereby disrupting the flow of fluid through the circulating chamber 42. Segments 43 perform the secondary function of preventing or minimizing the direct flow of the circulating fluid through the chamber 42 by virtue of their position between the fluid inlet and outlet. Consequently, the circulating fluid will be in a comparatively continual state of turbulence and thereby assuring a uniform state of heat absorption or radiation over the entire diaphragm surface 47.

The diaphragms illustrated, and the equivalent diaphragm structures, expand greatly the working abilities of valves employing these embodiments of my invention. Under normal operating temperatures, the need for a circulating fluid is eliminated and air may be allowed to pass through diaphragm chamber 23 of Fig. 1 and diaphragm chamber 42 of Fig. 3. Upon the development of an excessively high or low temperature in the pipeline, a fluid having appropriate heat exchange properties may be passed through the chambers protecting the diaphragm in use from the extreme pipeline temperatures. The diaphragms may be easily manufactured and assembled, thereby assuring a low production cost.

The wide application of my invention in valves employing diaphragm members of the type described has been shown in part in the foregoing detailed description. It is clear that other applications of my invention are therefore possible without departing from the spirit thereof as determined by the appended claims.

I claim:

1. In a flexible valve diaphragm having an internal chamber defined by a top wall portion and a bottom wall portion, a rim portion joining the peripheries of said wall portions, the diaphragm having at least one inlet and one outlet passage traversing said peripheral rim portion, at least one supporting member positioned substantially in a central portion of said internal chamber, the said supporting member comprising a transverse diaphragm portion having spaced apart arcuate wall portions joining said top wall and said bottom wall portions, the said transverse diaphragm portion being positioned in the said chamber between the respective inlet and outlet passages.

2. In a flexible valve diaphragm substantially as described having an internal flattened cylindrical chamber with an inlet and an outlet, transverse extending means spaced within said chamber, said inlet and said outlet being substantially diametrically disposed on an outer rimmed portion thereof, the said transversely extending means being arranged to interrupt direct fluid flow within the chamber between said inlet and outlet.

3. In a flexible diaphragm having an internal substantially cylindrical chamber defined by a top wall portion, a bottom wall portion, a rim portion interposed between the peripheries of said wall portions and integral therewith, said rim portion having a plurality of transverse apertures in spaced-apart annular relation, annularly disposed means therebetween integrally connecting the top and bottom wall portions and forming a baffle within said internal chamber.

References Cited in the file of this patent

UNITED STATES PATENTS

| | | |
|---|---|---|
| Re. 23,613 | Danks | Jan. 13, 1953 |
| 398,933 | Berg | Mar. 5, 1889 |
| 540,787 | Guldlin | June 11, 1895 |
| 2,504,057 | Trefil | Apr. 11, 1950 |
| 2,705,016 | Saar | Mar. 29, 1955 |